(12) United States Patent
Bissessur et al.

(10) Patent No.: US 6,807,600 B2
(45) Date of Patent: Oct. 19, 2004

(54) METHOD, SYSTEM, AND PROGRAM FOR MEMORY BASED DATA TRANSFER

(75) Inventors: Sailesh Bissessur, Phoenix, AZ (US); David R. Smith, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 140 days.

(21) Appl. No.: 10/205,546

(22) Filed: Jul. 24, 2002

(65) Prior Publication Data

US 2004/0019707 A1 Jan. 29, 2004

(51) Int. Cl.$^7$ .............................................. G06F 13/20
(52) U.S. Cl. ............................ 710/313; 710/52; 710/3
(58) Field of Search .............................. 710/313, 14, 8, 710/52, 65, 74, 3; 711/114

(56) References Cited

U.S. PATENT DOCUMENTS

| | | | |
|---|---|---|---|
| 4,535,404 A | | 8/1985 | Shenk |
| 5,838,932 A | | 11/1998 | Alzien |
| 6,094,699 A | * | 7/2000 | Surugucchi et al. ........ 710/314 |
| 6,233,641 B1 | | 5/2001 | Graham et al. |
| 6,275,876 B1 | | 8/2001 | Valk et al. |
| 6,710,620 B2 | * | 3/2004 | Libov et al. ................. 326/37 |
| 2004/0019709 A1 | * | 1/2004 | Bissessur et al. ............. 710/14 |

FOREIGN PATENT DOCUMENTS

WO    WO 02/073420    9/2001

OTHER PUBLICATIONS

Anderson, Don and Tom Shanley, *PCI System Architecture*, Fourth Edition, 1999, pp. I–xlii, 1–6, 143–151, 351–409, Addison–Wesley, Boston.

APT Technologies, Inc., "Serial ATA: High Speed Serialized AT Attachment", Revision 1.0, Aug. 29, 2001, pp. 1–7, 23–36.

Hosler, Brad, "Programming Interface for Bus Master IDE Controller", [online], Revision 1.0, May 16, 1994, pp. 1–6. Retreived from the Internet at <URL: http://www.bswd.com/idems100.pdf>.

"PCI IDE Controller Specification", [Online], Revision1.0, Mar. 4, 1994, pp. 1–5. Retrieved from the Internet at <htt://www.bswd.com/pciide.pdf>.

PCI Special Interest Group, "PCI Local Bus Specification", *PCI Local Bus*, Revision 2.2, Dec. 18, 1998, pp. i–xx, 1–6, & 189–220.

PCT International Search Report, Dec. 15, 2003, for International Application No. PCT/US 03/22943.

PCT International Search Report, Dec. 17, 2003, for International Application No. PCT/US 03/22784.

U.S. patent application Ser. No. 10/205,664, filed Jul. 24, 2002, entitled "Method, System, and Program for Controlling Multiple Storage Devices", invented by S. Bissessur & D. R. Smith.

* cited by examiner

*Primary Examiner*—Fritz M. Fleming
(74) *Attorney, Agent, or Firm*—Rabindranath Dutta; Konrad Raynes & Victor LLP (57) ABSTRACT

Provided are a method, system, and program for a local bus system. A memory address space in configured to control an I/O device. The memory address space is associated with a port coupled to the local bus system.

44 Claims, 5 Drawing Sheets

METHOD, SYSTEM, AND PROGRAM FOR MEMORY BASED DATA TRANSFER

BACKGROUND OF THE INVENTION

1. Field of the Invention

The present invention relates to a system, method, and program for memory based data transfer.

2. Description of the Related Art

A local input/output (I/O) bus is a high-speed input/output (I/O) bus used for coupling peripheral devices, such as storage devices, to a computer system. The Peripheral Component Interconnect (PCI) bus and enhancements to the PCI bus, such as the PCI-X bus, are the commonly used I/O buses.

A PCI physical device is a physical device that may be coupled to the PCI bus. Each PCI physical device may incorporate from one to eight separate PCI functions. A PCI function may be a logical device. Each PCI function may include a configuration header that may be configured to control peripheral devices coupled to the PCI bus. The configuration header may include configuration registers, such as base address registers. Six base address registers comprising base address register 0 (BAR0), base address register 1 (BAR1), base address register 2 (BAP2), base address register 3 (BAR3), base address register 4 (BAR4), base address register 5 (BAR5) may be present in the configuration header. Each base address register maybe 32 bits, i.e., a dword. Further details of the PCI bus are described in the publication entitled "PCI Local Bus Specification" by the PCI Special Interest Group (Revision 2.2, Copyright 1992, 1993, 1995, 1998 PCI Special Interest Group), hereinafter referred to as the "PCI Specification." Further details of the base address registers are described in Chapter 6 of the "PCI Specification."

A device adapter, such as a host bus adapter (HBA), may act as the interface between the PCI/PCI-X bus and the storage devices. The interface can control the transfer of data from a computer to a storage device and vice versa. Interfaces for storage disks include the Integrated Drive Electronics (IDE) interface (known also as an Advanced Technology Attachment interface i.e., ATA, interface) and the Serial ATA (SATA) interface. Further details of SATA are described in the publication entitled "Serial ATA: High Speed Serialized AT attachment" by the Serial ATA Working Group (Revision 1.0, Copyright 2001). Technologies analogous to IDE/ATA such as the ATA packet interface (ATAPI) are available for CD ROM and DVD drives. The bandwidth and processing capabilities of the interface can substantially affect system performance, system configuration, system compatibility, system upgradability, etc.

Methods of data transfer defined for devices that interface to a PCI/PCI-X bus include "Bus Master IDE" and "Programmed I/O" (PIO). Bus Master IDE utilizes a direct memory access (DMA) engine within the host bus adapter for the transfer of data, thereby reducing the load on the host processor. In PIO based data transfer, the device adapter acts as a slave, accepts read and write requests from an external bus master, such as the host processor or a bus master controller, and satisfies the request by reading or writing from the attached device. In prior art, data may be transferred one, two or four bytes at a time in PIO based data transfer.

In prior art PIO based data transfer mechanisms the device adapter may include a data port. The data port may be located at a byte address in an I/O address space. The I/O address space may be implemented in a manner known in prior art by a base address register in the device adapter's configuration header space. Since the data port is mapped to an address in the I/O address space, while writing data to a storage device, a PCI device can write two bytes of data to the data port at a time. Similarly while reading data the PCI device can read two bytes of data from the data port at a time. Therefore in prior art PCI IDE implementations of the PIO based data transfer, two bytes of data can be transferred at a time, i.e., two bytes of data are allowed per transaction in the PCI IDE PIO mode.

Notwithstanding the use of data transfer in host bus systems in prior art, there is a need for improved techniques for data transfer in host bus systems.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Described embodiments of the invention provide techniques to allow a PIO data transfer to be performed utilizing a memory address space. Using a memory address space increases the speed of data transfer by allowing burst PIO transactions. In burst PIO transactions a large amount of data (e.g., several kilobytes) may be transferred per transaction.

Figure 1:
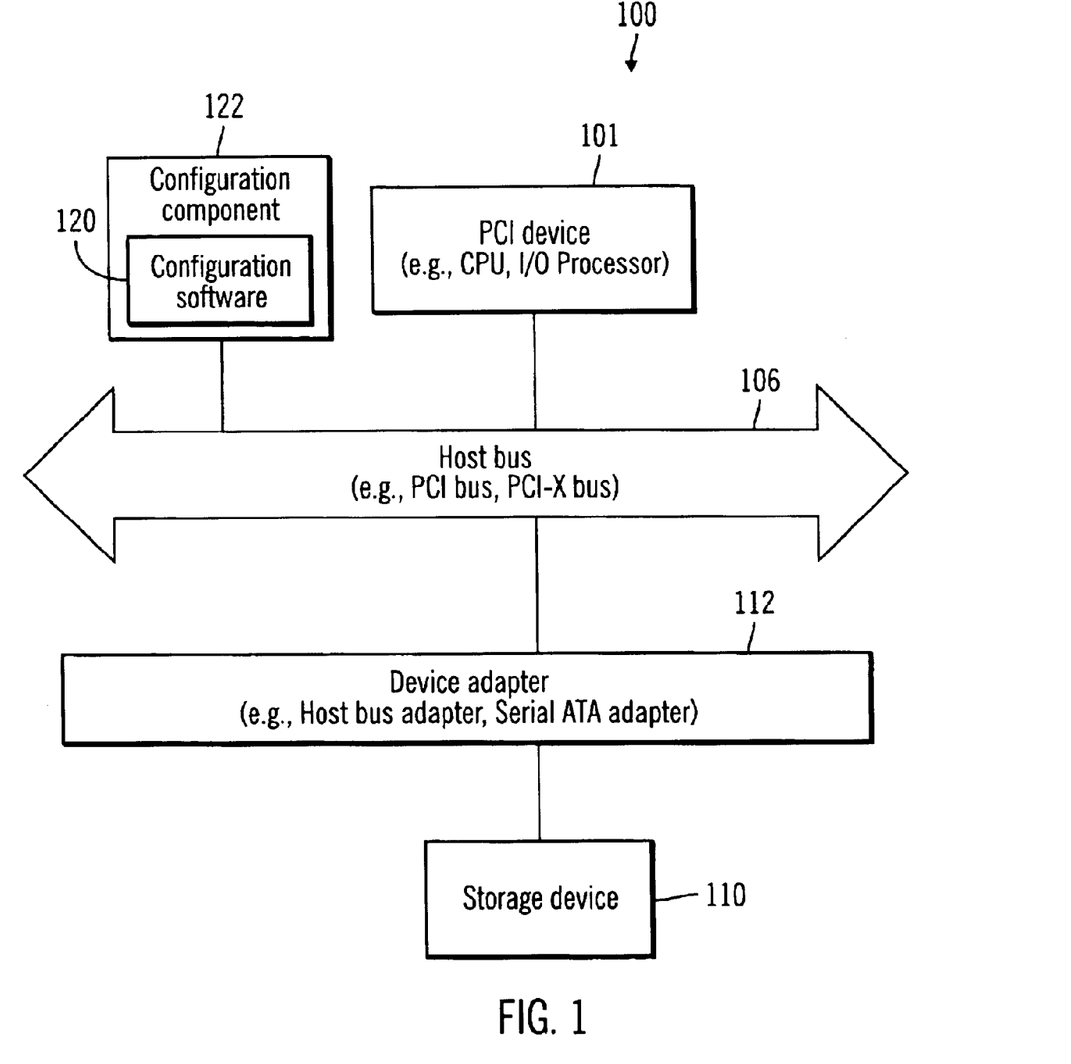
FIG. 1 illustrates a bus architecture for accessing data in storage devices in accordance with certain described embodiments of the invention.

FIG. 1 illustrates a system 100, including a bus architecture for accessing data in storage devices, such as ATA/ATAPI/SATA storage devices, in accordance with embodiments of the invention. A PCI device, such as a central processing unit (CPU) or an I/O processor, 101 is coupled to a host bus, such as a PCI (or a PCI-X) bus 106. The CPU may be any CPU known in art such as the INTEL x86 family of microprocessors, the PowerPC processor, etc. The I/O processor may comprise any I/O processor known in the art such as the INTEL 80321 or the INTEL 80310.

A storage device 110 is coupled to the PCI bus 106 via a device adapter 112, such as an Serial ATA (SATA) adapter. The storage device 110 may be any type of storage device known in the art, such as an SATA, ATA, ATAPI, etc., type of storage devices. The device adapter 112 may be any type of device adapter known in the art, such as SATA, ATA, ATAPI, etc., type of storage adapters. While one storage device 110 is shown, a greater number of storage devices may be connected to the PCI bus 106 via the device adapter 112.

Configuration software 120 included in a configuration component 122 can configure the system 100 such that the storage device 110 can exchange data via the PCI bus 106. The configuration component 122 is coupled to the host bus 106 and in certain implementations may be part of the PCI device 101 or be coupled to the PCI device 101. The configuration software 120 may be part of a BIOS, be part of a standalone software module, be part of device drivers, etc.

Figure 2:
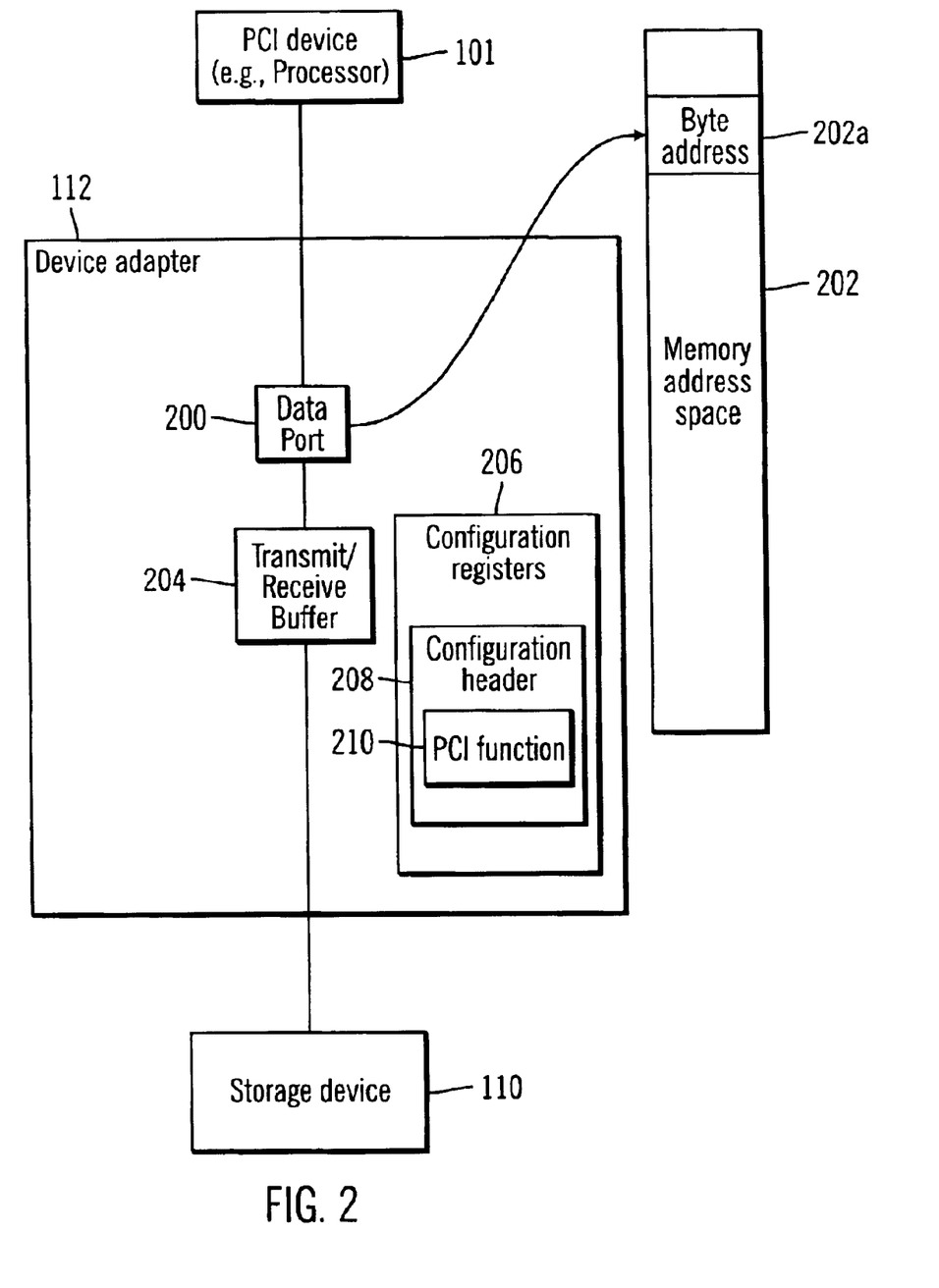
FIG. 2 illustrates a block diagram of a programmed I/O based data transfer mechanism that uses memory address space in accordance with certain described embodiments of the invention.

FIG. 2 illustrates a block diagram of a programmed I/O based data transfer mechanism that may be implemented in the system 100 in accordance with certain embodiments of the invention. The device adapter 112 includes a data port 200. The data port 200 is addressed at a byte address 202a in a memory address space 202.

Coupled to the data port 200 is a transmit/receive buffer 204 in the device adapter 112. The transmit/receive buffer 112 can store data that is sent from the PCI device 101 before the data is sent to the storage device 110. The transmit/receive buffer 112 can also store data that is received from the storage device 110 before the data is sent to the PCI device 101.

Since the data port 200 is addressed in the memory address space 202 it is possible to perform burst PIO transactions with the storage device 110 attached to the PCI bus 106. In burst PIO transactions a large amount of data (e.g., several kilobytes) may be transferred per transaction. Since data may stream through the transmit/receive buffer 204, data per transaction may exceed the size of the transmit/receive buffer 204.

The configuration software 120 implements the memory address space 202 by programming the configuration registers 206 located in the device adapter 112. The configuration software 120 configures a configuration header 208 that includes one or more of the configuration registers 206 to program settings that implement a PCI function 210. The PCI function 210 may map the storage device 110 to the memory address space 202 and control the storage device 110 in accordance with embodiments of the invention. In alternative embodiments of the invention, a lesser or a greater number of storage devices may be controllable by the PCI function 210. Further details of mechanisms to program the configuration registers 206 and the configuration header 208 are described in chapter 6 of the "PCI Specification."

The PCI device 101 may possess the ability to address two distinct address spaces: I/O and memory. The PCI device 101 may use PCI I/O and memory transactions to access PCI I/O and memory locations, respectively. In addition, a third access type, the configuration access, maybe used to access a device's configuration registers. The configuration registers 206 of the PCI function 210 may be initialized at the reset time of the system 100 to configure the PCI function 210 to respond to memory and I/O address ranges assigned to the PCI function by the configuration software 120.

When a system, such as system 100 is reset, configuration software, such as the configuration software 120, scans the various buses in the system 100 to determine what devices exist and what configuration requirements they have. The process is referred to as "scanning the bus" or "walking the bus." At this time, the configuration software 120 may write settings to the configuration registers 206 based on what is discovered when configuring the host bus 106.

Figure 3:
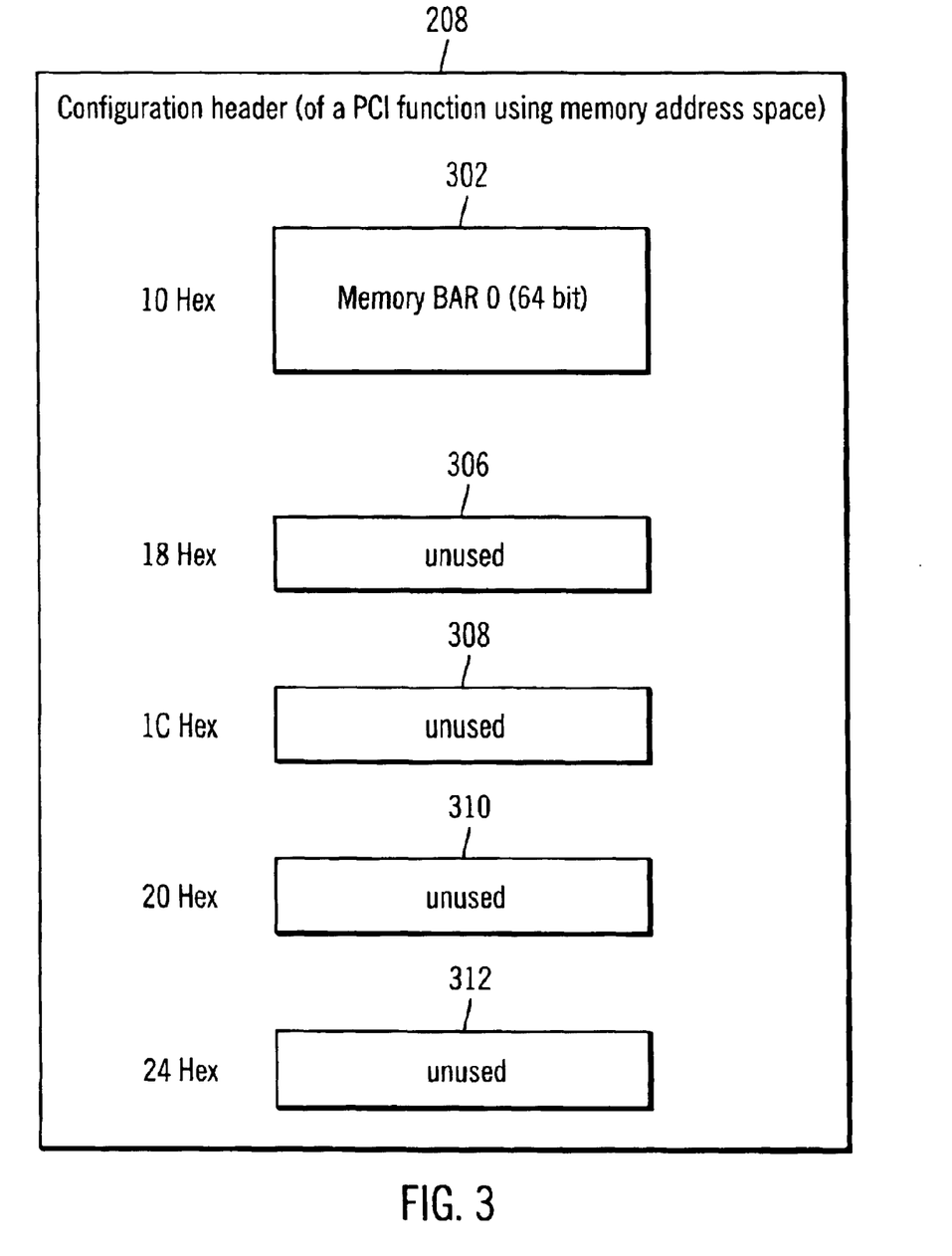
FIG. 3 illustrates a block diagram of a configuration header of a PCI function using memory address space in accordance with certain described embodiments of the invention.

FIG. 3 illustrates the configuration header 208 that provides the settings implementing the PCI function 210 for connectivity of the storage device 110 to the PCI bus 106, where the configuration header 208 is configured to define address assignments for the memory space 202 in accordance with certain embodiments of the invention, such as address assignments where the byte address 202a is assigned to address the data port 200.

In FIG. 3, the two 32-bit base address registers BAR0 and BAR1 are together configured as a 64 bit memory base address register (memory BAR indicated by reference numeral 302) starting at address 10 hex. In alternative embodiments, a starting address that is different from 10 hex can be used to store the memory BAR 302. In certain embodiments, the memory BAR 302 may be configured as a 32 bit register. In FIG. 3, the dwords 306, 308, 310, 312, corresponding to the base address registers BAR2, BAR3, BAR4, and BAR5 respectively, are left unused. The storage device 110 may be mapped into the memory space 202 by the memory BAR 302, i.e., the storage device 110 maybe accessed via the memory space 202. In certain embodiments the memory BAR 302 may be 64 bits long, and may locate an address in a $2^{64}$ bit memory space, wherein areas of the memory space correspond to regions used to control the storage devices 110. The storage device 110 may be controlled by accessing the memory space.

Therefore, the memory BAR 302 implements a "programmable memory decoder" in the PCI function 210. The configuration software 120 can assign a 64-bit memory address within the memory space 202 to the memory BAR 302. Since the memory BAR 302 may be 64 bits long, the total amount of addressable memory may be $2^{64}$ bytes, which is large enough to map the addresses of not only the storage device 110, but many storage devices. In one embodiment of the invention, the amount of memory space required to control the storage devices 110 is at most 512 bytes. With 512 bytes per storage device, the number of storage devices that may be addressed on the PCI bus 106 via the use of the memory BAR 302 is significantly large and may be greater than four. In alternative embodiments, the amount of memory space required to control the storage device 110 is a greater or lesser number of bytes. The number of bytes required to address a storage device is guided by the capabilities needed to control each device and is a function of the feature set to be supported for each device. In view of the large addressable space in the memory BAR 302 and the relatively smaller number of bytes required per storage device, the number of storage devices that can be supported simultaneously in embodiments of the invention is very large and can exceed four storage devices. Hence, embodiments of the invention provide configuration mechanisms such that the system 100 is able to convert accesses initiated by a CPU or an I/O processor comprising the PCI device 101, with certain predefined addresses in the memory space 202 into configuration access on the PCI bus 106.

Figure 4:
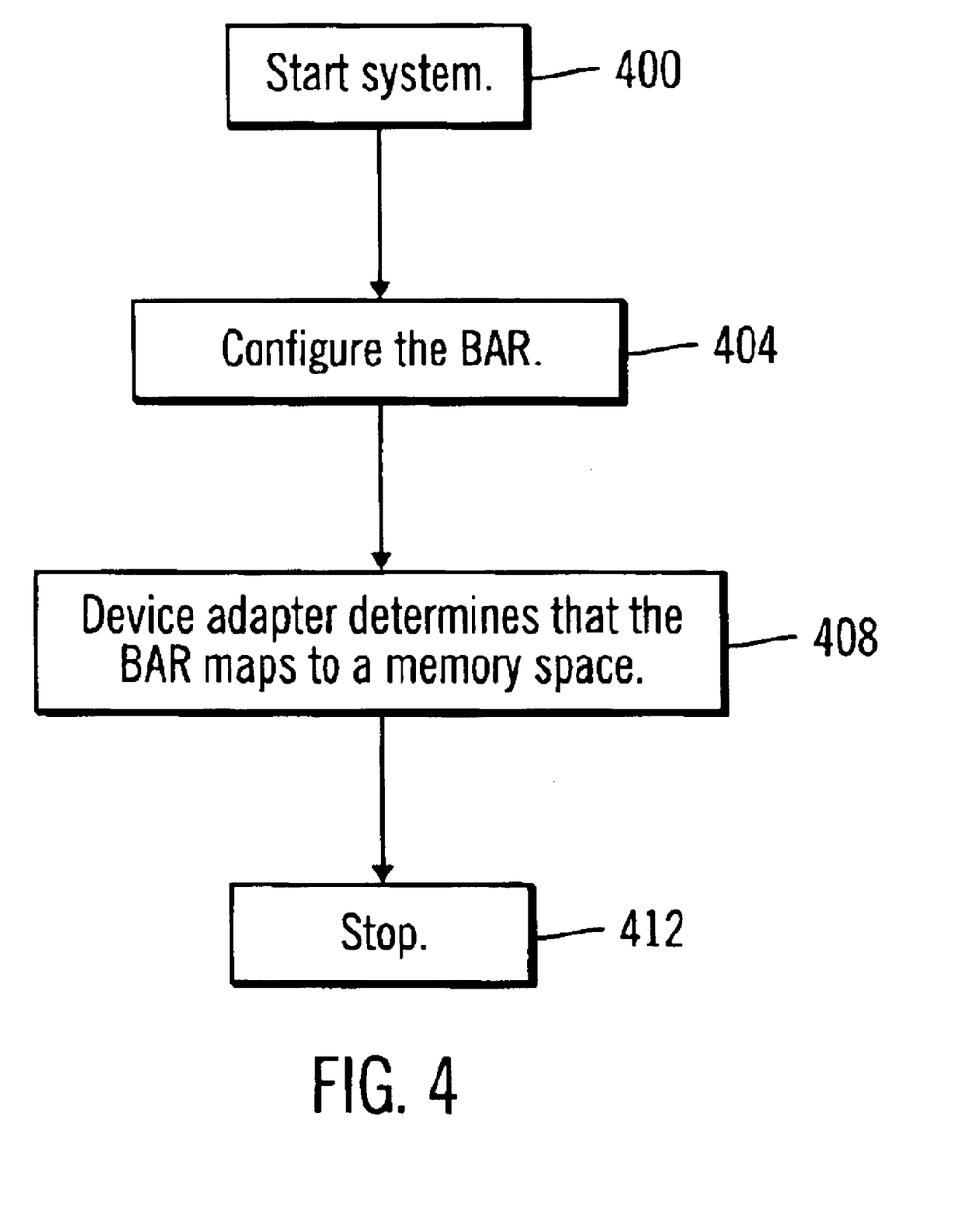
FIG. 4 illustrates logic for configuring a system for programmed I/O based data transfer in accordance with certain described embodiments of the invention.

FIG. 4 illustrates logic for configuring the system 100 for burst mode PIO data transfer between the PCI device 101 and the storage device 110 in accordance with certain embodiments of the invention.

At block 400, the system 100 is powered on. Control proceeds to block 404, where the configuration software 120 configures the memory BAR 302 as described in FIG. 3. Control proceeds to block 408, where the device adapter 112 determines that the memory BAR 302 maps to the memory address space 202. Control then proceeds to block 416 where the process for configuring the system 100 stops.

The logic described in FIG. 4 enables the device adapter 112 to transfer data in a burst PIO mode between the PCI device 101 and the storage device 110 in the system 100. Configuring the data port 200 to an address 202a in the memory address space 202 enables the burst mode PIO mode data transfer where in certain embodiments several kilobytes of data may be transferred per transaction.

Figure 5A:
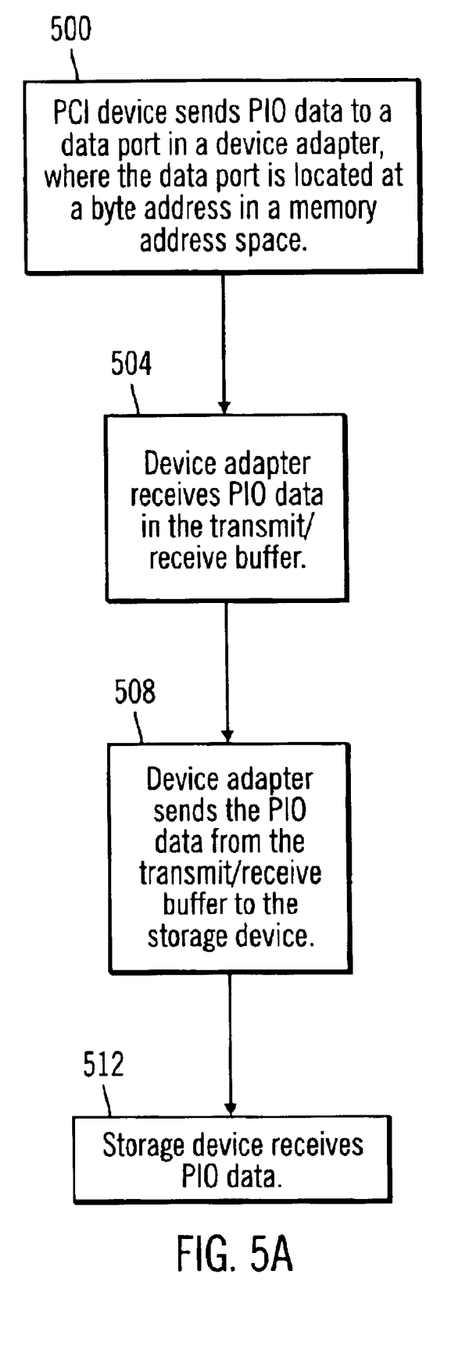
FIGS. 5*a* and 5*b* illustrate logic for programmed I/O based data transfer in accordance with certain described embodiments of the invention.

FIG. 5a illustrates logic for burst mode programmed I/O based data writes to the storage device 110 in accordance with certain embodiments of the invention. Control begins at block 500 where the PCI device 101 sends PIO data to the data port 200 on the device adapter 112, where the data port 200 is addressed by the byte address 202a in the memory address space 202. The PIO data is sent in a burst mode, i.e., the amount of data sent may be several kilobytes. The device adapter 112 receives (at block 504) the PIO data in the transmit/receive buffer 204 coupled to the data port 200. Control proceeds to block 508 where the device adapter 112 sends the PIO data from the transmit/receive buffer 204 to the storage device 110. The storage device 110 receives (at block 512) the PIO data sent by the PCI device 110.

Figure 5B:
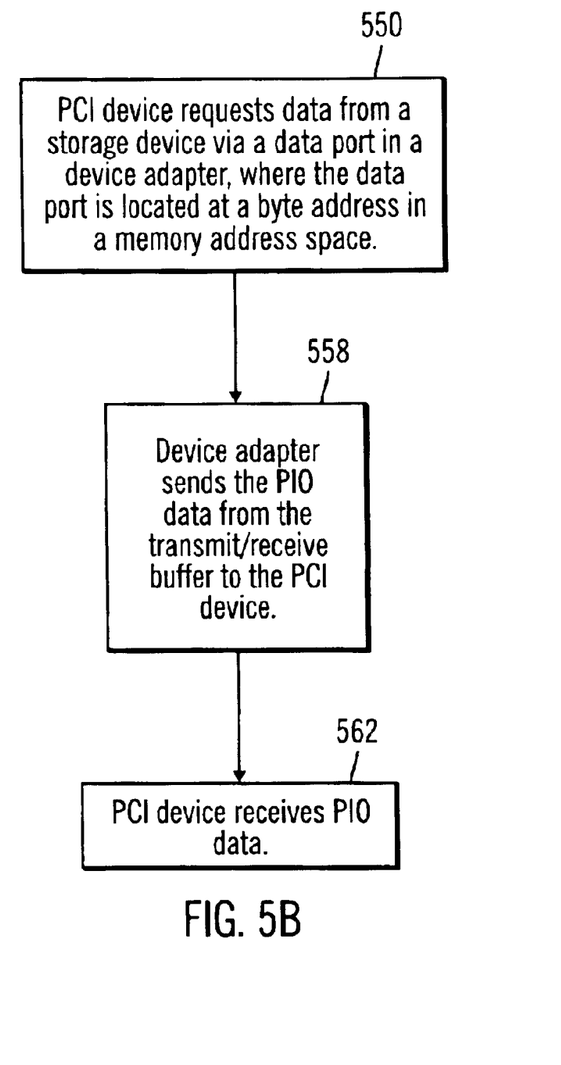

FIG. 5b illustrates logic for burst mode programmed I/O based data reads from the storage device 110 in accordance with certain embodiments of the invention. Control begins at block 550 where PCI device 101 requests data from the storage device 110 via the data port 200 on the device adapter 112, where the data port is addressed by the byte address 202a in the memory address space 202. The PIO data is received in a burst mode, i.e., the amount of data sent may be several kilobytes. Control proceeds to block 558, where the device adapter 112 sends the PIO data from the transmit/receive buffer 204 associated with the data port 200 to the PCI device 101. Control proceeds to block 562, where the PCI device 101 receives the burst mode PIO data.

The logic of FIGS. 5a and 5b illustrate the burst mode transfer of PIO data between the PCI device 101 and the storage device 110 via the transmit/receive buffer 204 coupled to the data port 200 of the device adapter 112. The data port is mapped to the memory address space 202. The memory address space 202 is created by configuring the memory base address register 302. The burst mode transfer of PIO data improves the speed of data transfer between the storage device 10 and the PCI device 101 (e.g., a processor) over the PCI bus 106. Therefore, the described embodiments provide improved techniques for PIO based data transfer in host bus systems where in certain implementations several kilobytes of data may be transferred per transaction.

Additional Embodiments

The operations described herein may be implemented as a method, apparatus or article of manufacture using standard programming and/or engineering techniques to produce software, firmware, hardware, or any combination thereof. The term "article of manufacture" as used herein refers to machine readable instructions or logic implemented in hardware logic (e.g., an integrated circuit chip, Programmable Gate Array (PGA), Application Specific Integrated Circuit (ASIC), etc.) or a machine readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessible and executable by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described embodiments, the storage devices communicate on a bus topology, such as a PCI-X or PCI bus topology. In alternative embodiments, the storage devices may communicate using any communication architecture known in the art. Alternative embodiments may use interfaces other than IDE, ATA, SATA or ATAPI.

In PCI bus embodiments, additional PCI-X or PCI bridges may be used. In certain embodiments, the storage devices comprised magnetic hard disk drives. In alternative embodiments, the storage devices may comprise any storage device known in the art, such as optical disks, tapes, CDROM drives, DVDs etc.

In the embodiments the length of registers have been illustrated with a certain number of bits. In alternative embodiments the length of the registers have a different number of bits.

The logic of FIGS. 4, 5a, and 5b describe specific operations occurring in a particular order. In alternative embodiments, certain of the logic operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

** Intel is a registered trademark of Intel Corporation. PowerPC is a registered trademark of IBM Corporation.

What is claimed is:

1. A method in a local bus system, comprising:

configuring a memory address space to control an I/O device;

associating the memory address space with a port in a device adapter coupled to the local bus system, wherein the port couples the I/O device to the device adapter, and wherein a buffer in the device adapter is associated with the port; and streaming data for a programmed I/O transaction with the I/O device through the buffer, wherein the streamed data for the programmed I/O transaction exceeds a size of the buffer, and wherein the programmed I/O transaction uses the memory address space.

2. The method of claim 1, wherein the port is a data port, and wherein the streamed data for the programmed I/O transaction exceeds two bytes.

3. The method of claim 2, wherein the streamed data for the programmed I/O transaction is programmed I/O data, wherein the streamed data for the programmed I/O transaction is at least one kilobyte, wherein the I/O device is a storage device, and wherein more than four storage devices are capable of simultaneously performing I/O transactions.

4. The method of claim 3, wherein configuring the memory address space further comprises:
associating a local bus function with the storage device; and
configuring at least two adjacent base address registers corresponding to the local bus function as a memory address in the memory address space, wherein to configured two adjacent base registers are used to control the storage device.

5. The method of claim 1, further comprising:
receiving at the port in the device adapter programmed I/O data from a PCI device, wherein the port maps to a byte address in the memory address space; and
transmitting from the device adapter to programmed I/O data to the I/O device.

6. The method of claim 5, wherein the programmed I/O data is received and transmitted via the buffer.

7. The method of claim 1, further comprising:
receiving a request for data at the port in the device adapter, wherein the port maps to a byte address in the memory address space, and wherein the request is from a PCI device;
based on the request, sending the request from the device adapter to the I/O device;
receiving programmed I/O data from the I/O device; and
sending the programmed I/O data to the PCI device.

8. The method of claim 7, wherein the programmed I/O data is received and transmitted via the buffer.

9. The method of claim 1, wherein the device adapter is a serial ATA adapter that is directly connected to a host bus.

10. The method of claim 1, wherein the I/O device is a ATA, IDE or SATA device, and wherein more than four I/O devices are capable of simultaneously performing I/O transactions through the device adapter.

11. The method of claim 1, wherein the port is one or more bytes in length.

12. A system, comprising:
a local bus;
a device adapter coupled to the local bus;
an I/O device coupled to the device adapter;
a memory address space configured to control the I/O device; and
a port implemented in the device adapter, wherein the memory address space is associated with the port; and
a buffer in the device adapter, wherein the buffer is associated with the port, wherein data for a programmed I/O transaction with the I/O device is capable of being streamed through the buffer, and wherein the streamed data for the programmed I/O transaction exceeds a size of the buffer, and wherein the programmed I/O transaction uses the memory address space.

13. The system of claim 12, wherein the port is a data port, and wherein the streamed data for the programmed I/O transaction exceeds two bytes.

14. The system of claim 13, wherein the streamed data for the programmed I/O transaction is programmed I/O data, wherein the streamed data for the programmed I/O transaction is at least one kilobyte, wherein the I/O device is a storage device, and wherein more than four storage devices are capable of simultaneously performing I/O transactions.

15. The system of claim 14, further comprising:
a local bus function associated with the storage device; and
at least two adjacent base address registers corresponding to the local bus function configured as a memory address in the memory address space, wherein the configured two adjacent base address registers are used to control the storage device.

16. The system of claim 12, further comprising:
a PCI device coupled to the local bus, wherein the port receives programmed I/O data from the PCI device, and wherein the port maps to a byte address in the memory address space, and wherein the programmed I/O data is transmitted from the device adapter to the I/O device.

17. The system of claim 16, wherein the programmed I/O data is received and transmitted via the buffer.

18. The system of claim 12, further comprising:
a PCI device coupled to local bus, wherein the port receives a request for data, wherein the port maps to a byte address in the memory address space, wherein the request is from the PCI device, wherein the request is sent from the device adapter to the I/O device, wherein programmed I/O data is received from the I/O device, and wherein the programmed I/O data is sent to the PCI device.

19. The system of claim 18, wherein the programmed I/O data is received and transmitted via the buffer.

20. The system of claim 12, wherein the port is one or more bytes in length.

21. The system of claim 12, wherein the device adapter is a serial ATA adapter that is directly connected to a host bus.

22. The system of claim 12, wherein the I/O device is an ATA, IDE or SATA device, and wherein more than four I/O devices are capable of simultaneously performing I/O transactions through the device adapter.

23. A system for transferring data with an I/O device coupled to a local bus, comprising:
a device adapter coupled to the local bus;
a memory address space configured to control the I/O device; and
a port implemented in the device adapter, wherein the memory address space is associated with the port; and
a buffer in the device adapter, wherein the buffer is associated with the port, wherein data for a programmed I/O transaction with the I/O device is capable of being streamed through the buffer, and wherein the streamed data for the programmed I/O transaction exceeds a size of the buffer, and wherein the programmed I/O transaction uses the memory address space.

24. The system of claim 23, wherein the port is a data port; and wherein the streamed data for the programmed I/O transaction exceeds two bytes.

25. The system of claim 24, wherein the streamed data for the programmed I/O transaction is programmed I/O data, wherein the streamed data for the programmed I/O transaction is at least one kilobyte, wherein the I/O device is a storage device, and wherein more than four storage devices are capable of simultaneously performing I/O transaction.

26. The system of claim 25, further comprising:
   a local bus function associated with the storage device; and
   at least two adjacent base address registers corresponding to the local bus function configured as a memory address in the memory address space, wherein the configured two adjacent base address registers are used to control the storage device.

27. The system of claim 23, further comprising;
   a PCI device coupled to the local bus, wherein the port receives programmed I/O data from the PCI device, wherein the port maps to a byte address in the memory address space, and wherein the programmed I/O data is transmitted from the device adapter to the I/O device.

28. The system of claim 27, wherein the programmed I/O data is received and transmitted via the buffer.

29. The system of claim 23, further comprising:
   a PCI device coupled to the local bus, wherein the port receives a request for data, wherein the port maps to a byte address in the memory address space, wherein the request is from the PCI device, wherein based on the request the request is sent from the device adapter to the I/O device, wherein programmed I/O data is received from the I/O device, and wherein the programmed I/O data is sent to the PCI device.

30. The system of claim 29,
   wherein the programmed I/O data is received and transmitted via the buffer.

31. The system of claim 23, wherein the port is one or more bytes in length.

32. The system of claim 23, wherein the device adapter is a serial ATA adapter that is directly connected to a host bus.

33. The system of claim 23, wherein the I/O device is an ATA, IDE or SATA device, and wherein more than four I/O devices are capable of simultaneously performing I/O transactions through the device adapter.

34. An article of manufacture, wherein the article of manufacture is capable of causing operations, the operations comprising:
   configuring a memory address space to control an I/O device; and
   associating the memory address space with a port in a device adapter coupled to a local bus system, wherein the port couples the I/O device to the device adapter, and wherein a buffer in the device adapter is associated with the port; and
   streaming data for a programmed I/O transaction with the I/O device through the buffer, wherein the streamed data for the programmed I/O transaction exceeds a size of the buffer, and wherein the programmed I/O transaction uses the memory address space.

35. The article of manufacture of claim 34, wherein the port is a data port,
   and wherein the streamed data for the programmed I/O transaction exceeds two bytes.

36. The article of manufacture of claim 35, wherein the streamed data is programmed for programmed I/O transaction is programmed I/O data, wherein the streamed data for the programmed I/O transaction is programmed I/O data, wherein the streamed data for the programmed I/O transaction is at least one kilobyte, wherein the I/O device is a storage device, and wherein more than four storage devices are capable of simultaneously performing I/O transactions.

37. The article of manufacture of claim 36, wherein configuring the memory address space further comprises:
   associating a local bus function with the storage device; and
   configuring at least two adjacent base address registers corresponding to the local bus function as a memory address in the memory address space, wherein the configured two adjacent base registers are used to control the storage device.

38. The article of manufacture of claim 34, further comprising:
   receiving at the port in the device adapter programmed I/O data from a PCI device, wherein the port maps to byte address in the memory address space; and
   transmitting from the device adapter the programmed I/O data to the I/O device.

39. The article of manufacture of claim 38, wherein the programmed I/O data is received and transmitted via the buffer.

40. The article of manufacture of claim 34, further comprising:
   receiving a request for data at the port in the device adapter, wherein the port maps to a byte address in the memory address space, and wherein the request is from a PCI device;
   based on the request, sending the request from the device adapter to the I/O device;
   receiving programmed I/O data from the I/O device; and
   sending the programmed I/O data to the PCI device.

41. The article of manufacture of claim 40, wherein the programmed I/O data is received and transmitted via the buffer.

42. The article of manufacture of claim 34, wherein the device adapter is a serial ATA adapter that is directly connected to a host bus.

43. The article of manufacture of claim 34, wherein the I/O device is a ATA, IDE or SATA device, and wherein more than four I/O devices are capable of simultaneously performing I/O transactions through the device adapter.

44. The article of manufacture of claim 34, wherein the port is one or more bytes in length.

* * * * *